United States Patent [19]

Swinkels

[11] 4,100,250

[45] Jul. 11, 1978

[54] SELECTIVE PRECIPITATION OF COPPER CHLORIDES FROM AQUEOUS SOLUTIONS WITH UNSATURATED ALIPHATIC HYDROCARBONS

[75] Inventor: Godefridus M. Swinkels, Rossland, Canada

[73] Assignees: Cominco Ltd., Vancouver; Sherritt Gordon Mines Limited, Toronto, both of Canada

[21] Appl. No.: 716,412

[22] Filed: Aug. 23, 1976

[30] Foreign Application Priority Data

Aug. 25, 1975 [CA] Canada .................................. 234318

[51] Int. Cl.$^2$ .............................................. C01G 3/04
[52] U.S. Cl. .......................................... 423/34; 423/42;
423/493; 260/438.1; 75/108
[58] Field of Search .................. 423/34, 42, 491, 245, 423/493; 260/430, 438.1, 429 L, 681.5 C

[56] References Cited

U.S. PATENT DOCUMENTS

| 1,795,549 | 3/1931 | Pfeiler ........................... 260/681.5 C |
| 2,188,899 | 2/1940 | Hebbard et al. ............... 260/681.5 C |
| 2,384,361 | 9/1945 | Amos ...................................... 423/42 |
| 2,386,256 | 10/1945 | Morris ............................... 260/438.1 |
| 3,130,243 | 4/1964 | Dunn ............................. 260/681.5 C |

OTHER PUBLICATIONS

Cotton et al., *Advanced Inorganic Chemistry*, 2nd Edition, Interscience, N.Y., 1967, pp. 772, 773, 896, 897, 1045.

*Primary Examiner*—O. R. Vertiz
*Assistant Examiner*—Brian E. Hearn
*Attorney, Agent, or Firm*—Arne I. Fors

[57] ABSTRACT

A process for the selective extraction of copper chlorides from aqueous solutions by forming a solid addition compound of cuprous chloride with an unsaturated aliphatic hydrocarbon having from 2 to 6 carbon atoms, separating and decomposing the addition compound and recovering solid cuprous chloride. The process can also be used for the separation of copper chlorides from silver-chloride. The process may be applied to the recovery of copper from hydrometallurgical process solutions.

11 Claims, No Drawings

SELECTIVE PRECIPITATION OF COPPER CHLORIDES FROM AQUEOUS SOLUTIONS WITH UNSATURATED ALIPHATIC HYDROCARBONS

BACKGROUND OF THE INVENTION

This invention relates to a process for the recovery of copper chlorides from aqueous solutions and, more particularly, relates to a process for the recovery of cuprous chloride from hydrometallurgical process solutions by extraction with unsaturated hydrocarbons.

In hydrometallurgical processes for the treatment of copper bearing materials employing chloride lixivium, cuprous chloride is a preferred intermediate compound because of the monovalent state of the copper. Moreover, the physical properties of the cuprous chloride make separation of copper from most other metals possible. The various known methods for obtaining cuprous chloride by hydrometallurgical processes, such as by crystallization, however, permit relatively low yields of cuprous chloride and are comparatively uneconomical.

It is well known that certain unsaturated hydrocarbons form addition compounds with compounds of metals such as copper, silver, mercury, platinum and palladium. In the petroleum processing industry this has been applied to the extraction of unsaturated hydrocarbons, particularly olefins and diolefins, from hydrocarbon mixtures.

In U.S. Pat. No. 1,795,549, which issued on Mar. 10, 1931, there is disclosed a process for the recovery of diolefins with conjugated double carbon bonds from gaseous mixtures by treating such mixtures with a heavy-metal salt and liberating the diolefins from the resulting addition compounds.

In German Pat. No. 611,460, which issued on Mar. 28, 1935, there is disclosed a process for the recovery of acetylene wherein copper is added to an acidic solution of cupric chloride, the resulting solution is treated with acetylene and the formed addition compound is decomposed at a temperature from 50° to 60° C. and/or under reduced pressure to recover the acetylene.

In U.S. Pat. No. 2,375,576, which issued on May 8, 1945, there is disclosed a process for concentrating and separating butadiene by passing a hydrocarbon liquid containing the diolefin in countercurrent flow with a cuprous salt solution and separating butadiene from separated cuprous salt solution by heating.

The prior art, however, does not disclose the extraction of copper chlorides from aqueous solutions encountered in hydrometallurgical processes for the recovery of copper from copper bearing materials by treating such solutions with unsaturated hydrocarbons.

STATEMENT OF INVENTION

I have discovered that cuprous chloride can be selectively extracted from aqueous hydrometallurgicalprocess solutions with increased efficiency by forming an insoluble addition compound of cuprous chloride and an unsaturated hydrocarbon, separating the formed addition compound, decomposing the separated addition compound and recovering the unsaturated hydrocarbon and solid cuprous chloride. Furthermore, I have discovered that cuprous chloride can be effectively separated from silver chloride.

Thus, it is a major object of the present invention to provide a process for extraction of copper from aqueous chloride solutions with an increased yield.

It is still another object of the present invention to provide a process for the selective extraction of cuprous chloride from hydrometallurgical process solutions.

It is a further object of the invention to provide a process for the separation of cuprous chloride from silver chloride.

These and other objects of the invention and the manner in which they can be attained will become apparent from the following description of the process of the invention.

DESCRIPTION OF THE PREFERRED EMBODIMENTS

In one embodiment of the process of the invention, aqueous solutions containing cuprous chloride are contacted with an unsaturated aliphatic hydrocarbon having from 2 to 6 carbon atoms to precipitate an addition compound of said hydrocarbon. The addition compound is separated from solution, decomposed for the removal of the hydrocarbon, and cuprous chloride is recovered.

In a second embodiment of the process of the invention, hydrometallurgical process solutions comprising copper chlorides and silver chloride are contacted with a gaseous unsaturated aliphatic hydrocarbon having from 2 to 6 carbon atoms to precipitate hydrocarbon addition compound. The addition compound is separated from residual solution and decomposed for removal of hydrocarbon. The hydrocarbon is recycled to contact further solution and at least one compound chosen from the group cuprous chloride and silver chloride is recovered.

Aqueous solutions containing copper chlorides are encountered in a number of organic chemical processes, in petroleum processing and are obtained as primary, intermediate or residual solutions in the treatment of copper-bearing materials by hydrometallurgical and electro-hydrometallurgical processes which employ chloride as anion. Such hydrometallurgical-process solutions comprise copper as cuprous chloride and cupric chloride, as well as chlorides of metals such as iron, zinc, calcium, magnesium, cobalt and silver. Of these chlorides, only cuprous chloride and silver chloride form addition compounds with unsaturated aliphatic hydrocarbons.

The unsaturated aliphatic hydrocarbons which may form addition compounds with cuprous and silver chloride are straight chain aliphatic hydrocarbons having from 2 to 6 carbon atoms and cyclo aliphatic hydrocarbons having from 4 to 6 carbon atoms, and excluding compounds usually considered as aromatic. Useful hydrocarbons are those chosen from the group acetylene, ethylene, propylene, butylene, isobutylene, butadiene, pentadiene, isoprene (methyl-butadiene), cyclobutene, cyclopentene, cyclohexene, cyclopentadiene and cyclohexadiene. The preferred hydrocarbons for carrying out the process of the present invention are the mentioned dienes and their derivatives and isomers while the most preferred hydrocarbon is 1–3 butadiene, referred to hereinafter as butadiene, which is readily and economically available. It is understood that the other mentioned compounds could also be used.

In the preferred embodiment of the process of the present invention, gaseous butadiene is contacted with a solution comprising cuprous chloride in a suitable reaction vessel and a yellowish precipitate of butadiene cuprous chloride is formed which I found to have a composition corresponding to the formula $2CuCl \cdot C_4H_6$.

The contacting, which can be carried out batchwise or in a continuous fashion, may be performed at a temperature in the range of from about $-35°$ to $+40°$ C. and preferably in the range of from about $-5°$ to $+25°$ C. Above a temperature of 40° C. some butadiene might be lost through undesirable side reactions. Before and during contacting with butadiene, the solution is cooled below a temperature of 40° C. and preferably below 25° C. The lower the temperature at which butadiene is contacted with the solution the more addition compound precipitates. The contact time depends on the reaction temperature and the desired degree of copper precipitation and may be as high as 15 hours but is usually between 0.1 and 3 hours. Pressure is normally atmospheric or autogenous. Using the preferred conditions the copper content of solutions can be reduced to about 5 g/l or less of cuprous copper.

The lowering of the copper content of solutions to about 5 g/l is a considerable improvement over, for example, crystallization, whereby the copper content can usually not be lowered to less than 20 g/l at reduced temperature.

During contacting some of the precipitate may tend to form an emulsion. If so desired, the formation of such emulsion may be depressed by the addition of, for example, an alkyl aryl sulfonate.

Cupric chloride may be present in the solutions being treated with butadiene; it does not react with butadiene and does not interfere. If so desired, any cupric chloride present in the solution may be reduced to the cuprous form. For example, it may be reduced prior to contacting by the addition of metallic copper and heating the mixture to a temperature of up to the boiling point of the solution.

To avoid reoxidation of the cuprous chloride in the solution to cupric chloride, excessive exposure of the solution to air or other oxygen bearing gas should be avoided. This can be accomplished by conducting the contacting in a closed vessel and purging air with, for example, butadiene and conducting the reaction in a butadiene atmosphere. If so desired an inert gas such as nitrogen may be used.

Silver chloride also forms an insoluble addition compound with butadiene and it may therefore, at least partly, co-precipitate with the cuprous chloride. I have found, however, that if the concentration of the cuprous copper in the solution is maintained above about 20 g/l, silver chloride will not precipitate and remain substantially in solution. Thus, a good separation of silver from copper in the solution may be obtained. It is understood that silver may also be quantitatively separated as its addition compound from solutions containing cuprous- and cupric-chloride by oxidation of the cuprous- to cupric-chloride.

The cuprous chloride-butadiene precipitate, which may or may not contain co-precipitated silver chloride, is separated from the residual solution. The separation may be accomplished by any well known method such as settling or filtration. The residual solution may be further treated for recovery of values.

The separated addition compound is subsequently decomposed for the recovery of solid cuprous chloride and butadiene gas. The addition compound is slurried in water or an acidic solution, e.g. a hydrochloric acid solution, and the slurry is decomposed by raising the temperature at atmospheric pressure or by reducing the pressure, or both. Thus, the decomposition of the slurry may be carried out in the range of from about 40° to 80° C. and the decomposition pressure may be in the range of from about 0.01 to 1.0 atmosphere absolute.

Butadiene is subject to polymerization at elevated temperatures. The decomposition of the addition compound should, therefore, be carried out in such a manner that polymerization is substantially avoided. Since the decomposition temperature of the addition compound of cuprous chloride and butadiene is about 60° to 65° C., the preferred temperature range for the decomposition is from about 40° to 65° C. at atmospheric pressure or at reduced pressures in the range of from about 0.01 to 0.9 atmosphere absolute. Towards the end of the decomposition the slurry is advantageously purged with an inert gas such as, for example, nitrogen or carbon dioxide. The evolved butadiene may be directly recycled for the precipitation of further addition compound.

The cuprous chloride is separated from the acidic solution by conventional means and may be washed to reduce occluded impurities. The substantially pure cuprous chloride may be further treated for the recovery of copper metal. Where no separation from silver was carried out, the cuprous chloride will contain silver chloride.

The contacting of solution with butadiene and the separation of the addition compound and its decomposition are advantageously carried out in a non-oxidizing atmosphere using an inert gas such as, for example, nitrogen.

EXAMPLE 1

Copper chloride containing solutions were reduced with copper powder at 80° C. in an atmosphere of nitrogen. Reactor vessels were partly filled with 50 ml. of each one of the reduced solutions. The vessels and contents were cooled to $-5°$ C., the vessels closed and evacuated. Gaseous butadiene was admitted at a controlled rate and fed under slight overpressure in a closed system, while the contents of each reactor vessel were externally circulated with the aid of a peristaltic pump. During contacting of solution with butadiene, the temperature was maintained constant at $-5°$ C. The butadiene consumption was recorded with time. After completion of the reaction, i.e. at the point at which no further butadiene was consumed, the reactor vessel contents were filtered. The starting and final solutions were analyzed. The analyses are compiled in Table I. From the total amounts of butadiene consumed it can be calculated that the amount of copper precipitated in test 1 should be 1.76 M and for test 2 should be 1.60 M. These amounts are slightly higher than is indicated by the composition of the precipitate which is mainly due to the fact that the starting solution absorbs a quantity of butadiene which in turn results in higher figures for the butadiene consumption. Generally it follows that the formula of the precipitate corresponds to $2CuCl \cdot C_4H_6$.

TABLE I

| Test No. | 1 | 2 |
| --- | --- | --- |
| Composition in M (molar concentration) | | |
| Starting Solution | | |
| Total Cu | 2.02 | 1.96 |
| $Cu^+$ | 1.99 | 1.95 |
| $Fe^{++}$ | — | 1.58 |
| $Na^+$ | 6.00 | 2.90 |

TABLE I-continued

| Test No. | 1 | 2 |
|---|---|---|
| Total Cl$^-$ | 8.05 | 8.05 |
| H$^+$ | 0.50 | 0.50 |
| Final Solution | | |
| Total Cu | 0.40 | 0.41 |
| Cu$^+$ | 0.38 | 0.40 |
| Total Cl$^-$ | 5.95 | 5.90 |
| Precipitate | | |
| Total Cu | 1.62 | 1.55 |
| Total Cl | 2.10 | 2.15 |

| Retention Time in Minutes | Butadiene Consumption in M at 25° C. and 1 atm. | |
|---|---|---|
| 3 | 0.04 | 0.04 |
| 6 | 0.22 | 0.09 |
| 12 | 0.78 | 0.76 |
| 18 | — | 0.80 |
| 21 | 0.85 | |
| 30 | 0.88 | |

EXAMPLE 2

A solution containing cupric chloride in a 3 molar concentration was treated with butadiene at a temperature of −5° C. No precipitate formed and no butadiene was consumed after 4 hours.

EXAMPLE 3

Using the apparatus and method as described in Example 1, a hydrometallurgical process solution analyzing 1.55 M Cu$^+$, 0.13 M Cu$^{++}$, 1.96 M Fe$^{++}$, 0.845 M Mg$^{++}$, 0.297 M Zn$^{++}$, 8.82 M Cl$^-$ and 0.812 M H$^+$ was treated with butadiene at various temperatures. The precipitated addition compound was separated from the residual solution and analyzed. The precipitate consisted solely of the cuprous chloride-butadiene addition compound and did not contain any cupric copper or any of the other metal values present in the starting solution. Some cuprous chloride crystallized out of the solution upon cooling to the desired reaction temperature. The crystals did not interfere with the precipitation and, in fact, were converted into the addition compound. Results are shown in Table II.

TABLE II

| Test No. | 1 | 2 | 3 | 4 |
|---|---|---|---|---|
| Precipitation temperature (° C.) | 25 | 25 | 5 | −5 |
| Retention time (min.) | 20 | 60 | 20 | 20 |
| Copper Precipitated (M) | 0.81 | 0.91 | 1.09 | 1.20 |

The results show that the amount of addition compound precipitated from a hydrometallurgical process solution can be increased by increasing the retention time and by lowering the reaction temperature.

EXAMPLE 4

6 liters of a solution from a hydrometallurgical process, containing 87 g/l Cu$^+$ and 25.6 mg/l silver as well as dissolved amounts of iron, magnesium and zinc, were treated with gaseous butadiene in a closed vessel. The reaction mixture was maintained under a slight pressure of butadiene and at a temperature of 12° C. After a period of 9 hours the treatment was stopped and the reaction mixture was filtered under nitrogen.

The solids were decomposed under vacuum at about 60° C. for 3 hours. The weight of final solids was 500 g. Upon analysis, the mother liquor from the filtration was found to contain 43 g/l Cu$^+$ and the solids after decomposition contained 3.42 mg. Ag. (0.2 oz./ton).

The mother liquor was again treated with gaseous butadiene at 12° C. for a period of 6 hours. The reaction mixture was filtered, the solids were slurried with 0.5 normal HCl and the slurry heated at a temperature of from 55° to 65° C. for 3 hours. After the decomposition the solids were dried. Upon analysis, the mother liquor from the filtration was found to contain 5.6 g/l Cu$^+$ and the dried solids after decomposition contained 25 mg. Ag. (1.1 oz./ton), 360 ppm Fe, 480 ppm Mg., 325 ppm Zn, 430 g. Cu and 246 g. Cl.

The results clearly show copper can be selectively extracted and that the content of cuprous copper in a hydrometallurgical process solution can be reduced by precipitation with butadiene to 5 g/l. The results also show that copper can be substantially separated from other metals such as iron, zinc and magnesium. The results show further that when the concentration of copper in solution during the treatment with butadiene is kept above 20 g/l, the silver is substantially retained in solution, while with a copper concentration below 20 g/l, silver is coprecipitated with the copper.

EXAMPLE 5

For comparison, a hydrometallurgical process solution containing 60.3 g/l Cu$^+$ was cooled from 100° C. to ambient temperature to crystallize cuprous chloride. After removal of the crystals, the mother liquor was found to contain 30.0 g/l Cu$^+$. Cooling the solution to 0° C. reduces the copper content in the mother liquor to about 22 g/l Cu$^+$. This result when compared with the reduction to 5 g/l Cu$^+$ according to Example 4 shows that the precipitation with butadiene is considerably more efficient than ordinary crystallization for the separation of cuprous chloride from solutions.

What I claim as new and desire to protect by Letters Patent of the United States is:

1. A process for treating an aqueous solution containing cuprous chloride and silver chloride for selective extraction of cuprous chloride and whereby silver chloride remains substantially in solution which comprises the steps of contacting said solution with gaseous butadiene and maintaining the temperature of the solution during said contacting in the range of from about −35° to +40° C. to precipitate a cuprous chloride-butadiene addition compound, said cuprous chloride being maintained in solution above about 20 g/l; separating said addition compound from residual solution; decomposing the separated addition compound at a temperature in the range of from 40° to 80° C for the removal of butadiene and recovering cuprous chloride.

2. A process as claimed in claim 1 wherein the temperature during said contacting is maintained in the range of from about −5° to +25° C.

3. A process as claimed in claim 1 wherein the contacting is carried out over a period in the range of from 0.1 to 15 hours.

4. A process as claimed in claim 1 wherein the decomposition is carried out at a temperature in the range of from about 40° to 65° C.

5. A process as claimed in claim 1 wherein the decomposition is carried out at a reduced pressure in the range of from about 0.01 to 0.9 atmosphere absolute.

6. A process as claimed in claim 1 wherein the steps are carried out substantially in the absence of an oxygen bearing gas.

7. A process as claimed in claim 1 wherein the butadiene removed in the decomposition step is recycled to the contacting step.

8. In a hydrometallurgical process for the recovery of copper from copper bearing materials by treating such materials with chloride containing lixiviant whereby solution is obtained containing cuprous chloride, cupric chloride and silver chloride as well as one or more chlorides of metals chosen from the group consisting of iron, zinc, calcium, magnesium and cobalt, the improvement of selectively recovering substantially pure cuprous chloride from said solution in the presence of silver chloride which comprises the steps of contacting said solution with a gaseous unsaturated aliphatic hydrocarbon chosen from the group consisting of straight chain aliphatic hydrocarbons having from 2 to 6 carbon atoms and cyclo aliphatic hydrocarbons having from 4 to 6 carbon atoms to precipitate hydrocarbon cuprous chloride addition compound at a temperature in the range of about $-35°$ to $+40°$ C, maintaining the concentration of cuprous copper in the solution above about 20 g/l whereby the silver chloride remains substantially in solution, separating the addition compound from residual solution, decomposing said addition compound for removal of the hydrocarbon at a temperature in the range of about 40° to 80° C, recycling said removed hydrocarbon to the contacting step and recovering substantially pure cuprous chloride, said process steps being carried out substantially in the absence of an oxygen bearing gas.

9. A process as claimed in claim 8 wherein said gaseous unsaturated aliphatic hydrocarbon is butadiene, the temperature during said contacting is maintained in the range of from about $-5$ to $+25°$ C and said contacting is carried out over a period in the range of from 0.1 to 15 hours, and the decomposition is carried out at a temperature in the range of from about 40° to 65° C at a reduced pressure in the range of from about 0.01 to 0.9 atomsphere absolute.

10. A process as claimed in claim 8, the improvement in addition comprising the steps of reducing cupric chloride to cuprous chloride in a non-oxidizing atmosphere at a temperature of up to the boiling point of the solution prior to contacting with the hydrocarbon, contacting the solution with said hydrocarbon for selective recovery of cuprous chloride and further contacting with said hydrocarbon until the content of cuprous chloride in the solution is reduced to about 5 g/l cuprous copper and recovering cuprous chloride and silver chloride.

11. A process as claimed in claim 10 wherein said gaseous unsaturated aliphatic hydrocarbon is butadiene, the temperature during said contacting is maintained in the range of from about $-5$ to $+25°$ C and said contacting is carried out over a period in the range of from 0.1 to 15 hours, and the decomposition is carried out at a temperature in the range of from about 40 to 65° C at a reduced pressure in the range of from about 0.01 to 0.9 atmosphere absolute.

* * * * *